United States Patent [19]
Yoder et al.

[11] Patent Number: 5,441,022
[45] Date of Patent: Aug. 15, 1995

[54] VEHICLE IGNITION SWITCH

[75] Inventors: Lamar D. Yoder, Fort Wayne; Max E. Young, Albion; Brian P. Marshall, Fort Wayne, all of Ind.; Rodney N. Germann, Payne, Ohio

[73] Assignee: Navistar International Transportation Corp., Chicago, Ill.

[21] Appl. No.: 226,604

[22] Filed: Apr. 12, 1994

[51] Int. Cl.⁶ .................. B60R 25/04; F02N 11/08
[52] U.S. Cl. .................. 123/179.3; 307/10.5
[58] Field of Search ............ 123/179.3, 179.1, 198 B, 123/146.5 B, 179.5; 307/10.5, 10.3; 70/239

[56] References Cited

U.S. PATENT DOCUMENTS

| | | | |
|---|---|---|---|
| 2,519,758 | 8/1950 | Heidman, Jr. ................ | 307/10.3 |
| 4,993,627 | 2/1991 | Phelan et al. ................ | 307/10.5 |

*Primary Examiner*—Andrew M. Dolinar
*Attorney, Agent, or Firm*—Dennis K. Sullivan

[57] ABSTRACT

An ignition switch of an automotive vehicle employs a non-contacting key reader for reading a code on a key when the key is inserted lengthwise into the switch. Such a key reader is either a magnetic one that reads a magnetically coded key or an optical one that reads an optically coded key. A detent mechanism defines successive Accessory and On (Ignition) positions as the key is increasingly inserted. Various branch circuits are switched on to the vehicle's electric power supply at these two positions provided that a valid key has been detected. Full insertion of the key physically pushes a spring-loaded plunger of a mechanical start switch at the inner end of the ignition switch, causing start switch actuation and the engine starter motor to crank the engine, provided that the key is valid. Once the engine starts, the key is released and is returned to the On position.

19 Claims, 3 Drawing Sheets

| KEY POSITION | ACC'Y FEED | IGN FEED | GLOW PLUG & STARTER MOTOR | 4WAY FLASHER | PARK BRAKE | BULKHEAD DOOR |
|---|---|---|---|---|---|---|
| OFF | OFF(OFF) | OFF(OFF) | OFF(OFF) | OFF(OFF) | SET(SET) | −(TIME/RELEASE) |
| ACCESSORY | ON(ON) | OFF(OFF) | OFF(OFF) | −(-) | −(-) | −(TIME/RELEASE) |
| ON | ON(ON) | ON(ON) | ON(ON) | −(-) | −(-) | −(-) |
| START | OFF(OFF) | ON(ON) | ON(ON) | −(TIME/OFF) | −(-) | −(-) |

VEHICLE PARKED (VEHICLE RUNNING)

FIG. 6

VEHICLE IGNITION SWITCH

FIELD OF THE INVENTION

This invention relates generally to key-operated ignition switches for automotive vehicles and in particular to a novel ignition switch that relies on linear, rather than rotary, motion of a key for operation to its various positions.

BACKGROUND AND SUMMARY OF THE INVENTION

The key-operated ignition switch that enjoys virtually universal usage in modern automotive vehicles is one that comprises a lock having a barrel with a slot into which a metal key is inserted. If the key is valid, the pattern that has been cut into an edge of its shaft to create the key's teeth sets the lock tumblers so as to just free them from locking engagement with the barrel, thereby allowing the barrel to rotate when the base of the key is turned. Typically, the barrel can be rotated from an Off position selectively to Accessory, On (Ignition), and Start positions to selectively connect various branch circuits of the vehicle's electrical system to the vehicle's electric power supply.

Repeated operation of the ignition switch naturally occasions mechanical wear and in certain types of vehicles, pick-up and delivery vehicles for instance, the ignition switch is operated relatively frequently so that as a result, such a vehicle has a ratio of switch operations to miles traveled that is considerably higher than other types of vehicles, such as heavy trucks and personal cars. Therefore, the life expectancy of an ignition switch in pick-up and delivery vehicles is below average when measured in terms of vehicle miles traveled, and ignition switch replacement is more apt to occur in vehicles that are used for this type of service. Accordingly, an improvement that would extend the life expectancy of an ignition switch would be advantageous for such vehicles since the probability that a switch would need replacement after a given amount of vehicle miles traveled would be reduced. The present invention is directed toward such an improvement.

The invention arises at least in part through the recognition that it is the rotary motion imparted through the key that is a significant contributor to mechanical wear. Hence, the invention avoids such motion, and instead, employs linear motion of a key for selectively operating the switch to its various positions. The inventive switch comprises neither rotary barrel nor tumblers. A preferred embodiment comprises a detent mechanism to define various operating positions, and to the extent that there is any wear, it is only to overcome the detent mechanism as the key is either being inserted into or removed from the switch. The preferred embodiment likewise does not rely on mechanical means of keying, but rather comprises a non-contacting key reader, such as an optical or magnetic reader, for reading a corresponding code that has been imparted to an associated key. In the exemplary switch to be herein disclosed, the detent mechanism comprises means that as the key is increasingly inserted into the switch defines in succession, an Accessory position and an On (Ignition) position. A Start position is reached by inserting the key still further into the ignition switch beyond the On position against a return spring force that is urging the key back toward the On position. In this way the start function is caused to occur in a manner similar to pushing of the separate start push-button switch that was formerly extensively used in the automotive industry when the ignition switch and the start switch were two separate switches on the instrument panel, only the former of which was key-operated. In other words, the present invention contemplates that once the vehicle's engine has started, the releasing of the key will automatically cause the switch to return from the Start position to the On position by virtue of the return spring force, analogous to the start function ceasing when the start push-button in the earlier type of system was released.

An ignition switch that utilizes a non-contacting key reader provides certain advantages over a mechanical key switch. For example, it allows control of certain features or functions, such as lights, latches, and data collection, to occur in conjunction with the operation of the ignition switch. Also, it allows on-line programming of the code into the key, with the possibility of purchasing key blanks in bulk and creating as many or as few keys as needed. The use of a retaining ring and detent mechanism, as hereinafter described, also allows simple and convenient removal of the shaft of a broken key front the switch should such breakage occur while the shaft is in the switch.

The foregoing, as well as further features, advantages, and benefits of the invention, will become apparent as the description proceeds. Drawings accompany the disclosure and represent a presently preferred embodiment of the invention in accordance with the best mode contemplated at this time for carrying out the invention.

BRIEF DESCRIPTION OF TEE DRAWINGS

FIG. 6 is a diagram depicting the condition of various branch circuits for the various positions of the ignition switch.

DESCRIPTION OF THE PREFERRED EMBODIMENT

Figure 1:
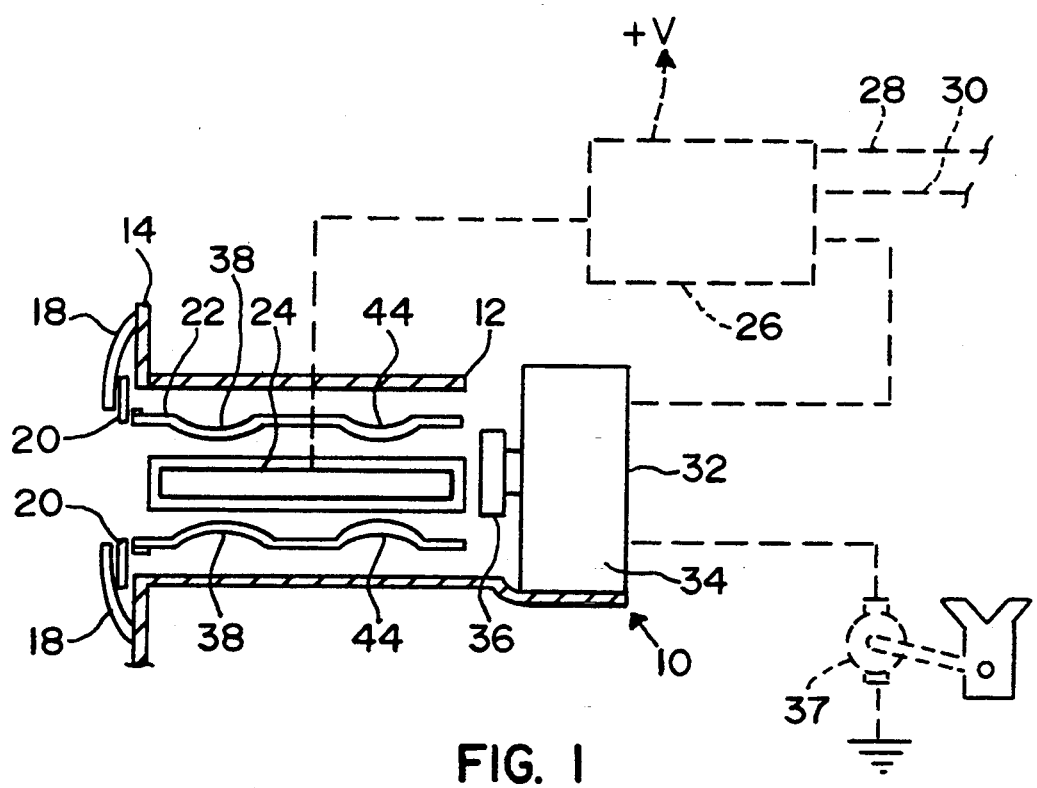
FIG. 1 is a longitudinal cross section view through an ignition switch embodying principles of the invention and includes a representative mounting of the ignition switch in an instrument panel of an automotive vehicle.
Figure 2:
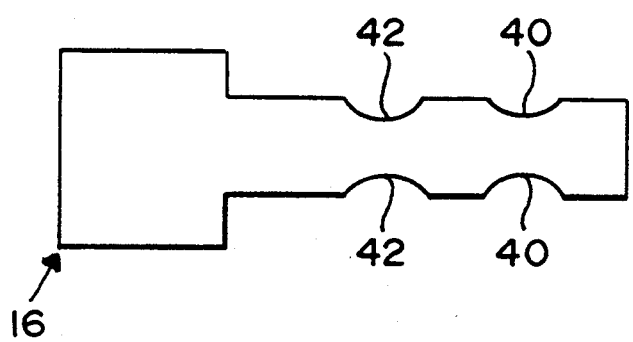
FIG. 2 is a longitudinal view of a key that is used with the ignition switch of FIG. 1.

FIG. 1 shows an ignition switch 10 embodying principles of the present invention and comprising a housing 12 that is mounted in an instrument panel 14 of an automotive vehicle. Housing 12 is open at the front for registry with a hole in instrument panel 14 to allow lengthwise insertion of the shaft of an associated key 16 (FIG. 2) into housing 12. An annular bezel 18 is shown overlapping both the margin of the instrument panel hole and a removable retainer ring 20 that serves to capture a detent mechanism 22 within housing 12. Detent mechanism 22 defines several detent positions for insertion of key 16 in switch 10.

Housing 12 is constructed to be associated with an adjacent non-contacting key reader 24 that reads a code on key 16 when the key has been inserted into the ignition switch. By way of example, key reader 24 is either a magnetic code reading device that reads a magnetic code on the key to create a corresponding electric signal or an optical code reading device that optically reads a code on the key to create a corresponding electric signal. The key reader itself may have the capability to distinguish a valid code from an invalid one, in which case it supplies a signal to an electronic control module (ECM) 26 to indicate either validity or invalidity of the inserted key. Alternatively, the key reader may read the code and supply an undecoded electrical signal to an electronic control module (ECM) 26 that is capable of decoding the signal in accordance with conventional decoding techniques to either confirm or deny the validity of an inserted key. ECM 26 in turn controls the application of vehicle electrical system power +V to various branch circuits, Such as those represented by 28, 30, in accordance with recognition of a validly coded key and the particular position to which the key has been inserted into the switch.

Poised at the inner end of housing 12 is a mechanical start switch 32 comprising a housing 34 and a spring-loaded plunger 36. FIG. 1 shows the non-actuated position of switch 32, which is the position assumed when the key has not been fully inserted into ignition switch 10. In this position, start switch 32 is open. But full insertion of the key into ignition switch 10 depresses plunger 36, causing start switch 32 to close. Closure of start switch 32, in conjunction with reader 24 having detected a valid key, is effective to operate an electric starter motor 37 that cranks the vehicle engine at engine starting.

Figure 3:
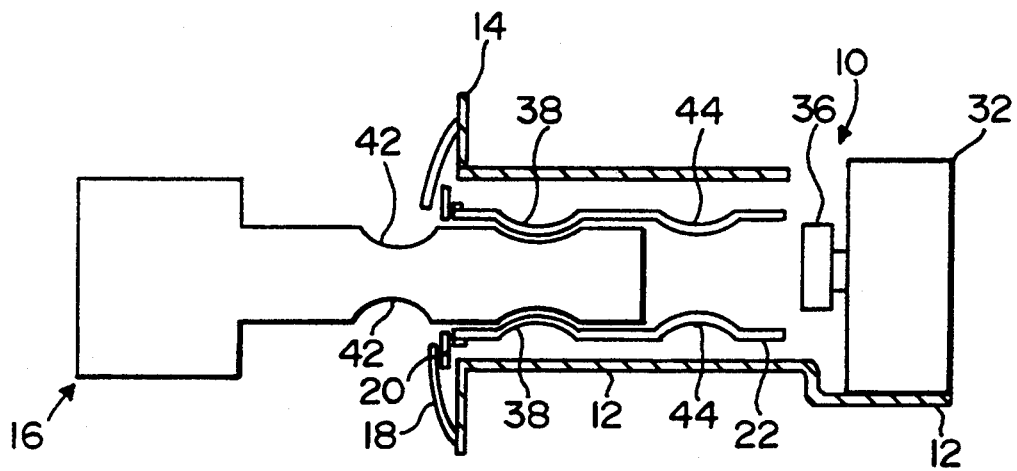
FIG. 3 is a view similar to FIG. 1 showing the key of FIG. 2 partially inserted into the switch and representing the Accessory position.
Figure 4:
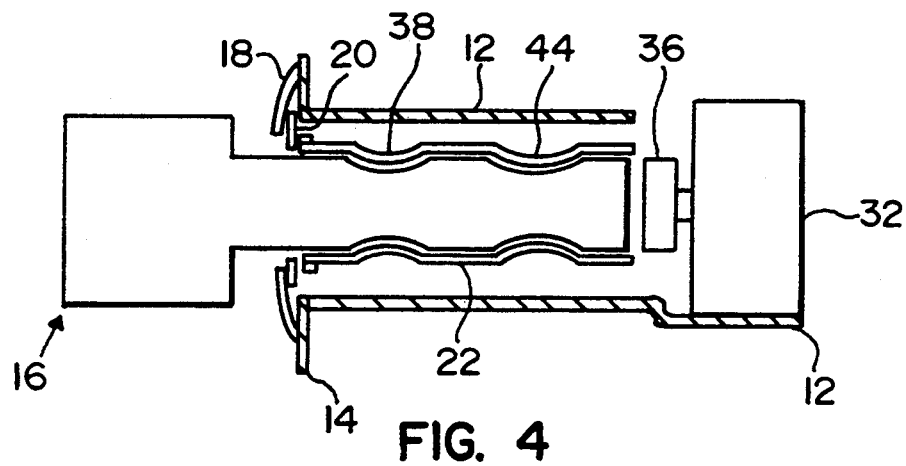
FIG. 4 is a view similar to FIG. 3 showing the key more fully inserted into the switch and representing the On (Ignition) position.

Detent mechanism 22 and key 16 serve to cooperatively define two discrete, stable positions for the lengthwise insertion of key 16 into housing 12. The first of these two positions is an Accessory position depicted by FIG. 3, and the second is an On (Ignition) position depicted by FIG. 4. Detent mechanism 22 comprises means 38 that engages a complementary means (notch) 40 of key 16 for defining the first preferred stable position of insertion of key 16 into the ignition switch, i. e. the Accessory position. The second preferred stable position of insertion of key 16 (i.e., the On position, which is beyond the Accessory position) is defined by the concurrent engagement of means 38 with a complementary means 42 of key 16 and of complementary means 40 by a means 44 of detent mechanism 22. In both the Accessory and the On positions, start switch 32 is not being actuated by key 16.

Figure 5:
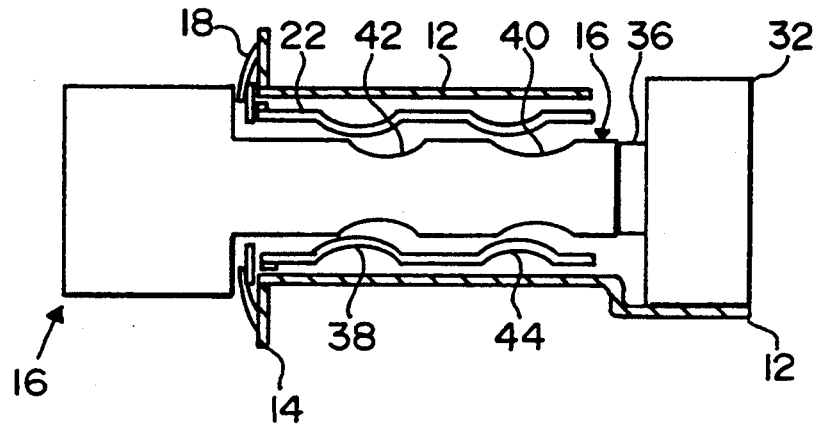
FIG. 5 is a view similar to FIGS. 3 and 4 showing the key fully inserted into the switch and representing the Start position.

Continued lengthwise insertion of key 16 into the ignition switch beyond the On position is effective to depress plunger 36 and thereby actuate start switch 32. This is the Start position represented by FIG. 5. Provided that key reader 24 has read a valid code on the inserted key, certain of the branch circuits controlled by ignition switch 10 will have been energized from the vehicle's electric power source +V So that the depression of plunger 36 will be effective to crank starter motor 37 and cause the engine to start. Once the engine has started, the key is released by the driver and returned to the On position by the detent mechanism and/or the spring-loaded plunger of the start switch.

FIG. 6 depicts conditions for various branch circuits as a function of various positions of ignition switch 10. It can be seen that when the key is not inserted, the accessory feed branch circuit, the ignition feed branch circuit, and the glow plug and starter motor branch circuit are not being switched to the +V supply. When the key is inserted to the first (Accessory) position (FIG. 3), and the key reader reads a valid Code on the key in this key position, the accessory feed branch circuit is switched on to the +V supply. An invalid code on a key will prevent the +V supply from being switched on to the accessory feed branch. Further insertion of a valid key to the second (On) position (FIG. 4) is read by the key reader and causes both the accessory and the ignition feed branch circuits to be switched to the +V supply. An invalid key code does not result in such switching. Further insertion of a valid key to the Start position results in the key reader disconnecting the accessory feed branch circuit from the +V supply, while connecting the ignition feed branch circuit and the glow plug and starter motor branch circuit to the +V supply, thereby enabling Starter motor 37 to crank the engine upon the mechanical actuation of start switch 32. Four-way flasher, park brake, and bulkhead door functions may also be performed in accordance with ignition switch positioning as indicated by the diagram of FIG. 6.

Because ignition switch 10 operates to Accessory, On, and Start positions without turning of key 16, it poses less risk that the shaft of an inserted will break off inside it. However, should a breakage, sticking, or other problem occur, bezel 18 and retailer ring 20 can be quickly and easily removed to allow access for withdrawing a part, or parts, through the frontal opening created by removal of the bezel and retainer ring.

While a presently preferred embodiment of the invention has been described in accordance with the best mode contemplated at this time for carrying out the invention, it should be appreciated the principles of the invention are applicable to all embodiments that fall within the scope of the following claims. For example, an ignition switch may omit the accessory position.

What is claimed is:
1. An automotive vehicle comprising:
   A) an engine for powering the vehicle;
   B) an electric system including
      1) an electric power source,
      2) an electric starter motor for cranking the engine when the engine is to be started,
      3) plural branch circuits, including a starter branch circuit operatively coupled with said starter motor, and
      4) an ignition switch for selectively connecting said electric power source with said branch circuits, said ignition switch comprising key-receiving means for receiving an associated key by lengthwise insertion of such a key into said key-receiving means along an imaginary axis at one particular circumferential orientation about such axis;
   characterized in that: said ignition switch comprises,
      5) an associated key-reading means for non-contact reading of a code of such a key after such a key has been initially inserted lengthwise into said key-receiving means along such axis at such orientation and for distinguishing a valid code from an invalid code,
      6) means for causing said electric power source to be switched on to one of said branch circuits other than said starter branch circuit in consequence of said key-reading means reading a valid code on such a key, and

7) means for causing said electric power source to be switched on to said starter branch circuit and said starter motor to crank said engine in response to increased insertion of such a key into said key-receiving means along such axis at such orientation beyond initial insertion, provided that said key-receiving means has read a valid code on such a key.

2. An automotive vehicle as set forth in claim 1 characterized further in that said key-receiving means comprises detent means defining at least one preferred stable position for lengthwise insertion of such a key into said key-receiving means.

3. An automotive vehicle as set forth in claim 2 characterized further in that said key-receiving means is disposed to read the code on such a key when the key is in a preferred stable position defined by said detent means.

4. An automotive vehicle as set forth in claim 1 characterized further in that said means for causing said electric power source to be switched on to said starter branch circuit and said starter motor to crank said engine in response to increased insertion of such a key into said key-receiving means, provided that said key-receiving means has read a valid code on such a key, comprises a start switch that is disposed to be physically pushed by such a key upon such increased insertion of the key into said key-receiving means.

5. An automotive vehicle as set forth in claim 1 characterized further in that said key-receiving means comprises a magnetic code reader for reading a magnetically coded key.

6. An automotive vehicle as set forth in claim 1 characterized further in that said key-reading means comprises an optical code reader for reading an optically coded key.

7. A automotive vehicle comprising
A) an engine for powering the vehicle;
B) an electric system including
 1) an electric power source,
 2) an electric starter motor for cranking the engine when the engine is to be started,
 3) plural branch circuits, including a starter branch circuit operatively coupled with said started motor, and
 4) an ignition switch for selectively connecting said electric power source with said branch circuits, said ignition switch comprising key-receiving means for receiving an associated key by lengthwise insertion of such a key into said key-receiving means;
characterized in that: said ignition switch comprises,
 5) an associated key-reading means for non-contact reading of a code of such a key after such key has been initially inserted lengthwise into said key-receiving means and for distinguishing a valid code from an invalid code,
 6) means for causing said electric power source to be switched on to one of said branch circuits other than said starter branch circuit in consequences of said key-reading means reading a valid code on such a key, and
 7) means for causing said electric power source to be switched on to said starter branch circuit and said starter motor to crank said engine in response to increased insertion of such a key into said key-receiving means beyond initial insertion, provided that said key-receiving means has read a valid code on such a key;
characterized further in that said key-receiving means comprises detent means that defines two preferred stable positions, namely an Accessory position and an On (Ignition) position, and said key-reading means is effective to distinguish such a key occupying the accessory position and such a key occupying the On position and to cause said electric power source to be switched on to an accessory branch circuit when such a key is in the Accessory position and to be switched on to both such an accessory branch circuit and an ignition branch circuit when such a key is in the On position.

8. An automotive vehicle ignition switch for use in selectively connecting an electric power source with plural branch circuits, including a starter branch circuit operatively coupled with a starter motor for cranking an engine of a vehicle, and comprising key-receiving means for receiving an associated key by lengthwise insertion of such a key into said key-receiving means along an imaginary linear axis at one particular circumferential orientation about such axis characterized in that said ignition switch comprises:
A) means for distinguishing a valid key from an invalid key upon initial insertion of such key lengthwise into said key-receiving means along such axis at such orientation,
B) means for causing such an electric power source to be switched on to one of such branch circuits other than such a starter branch circuit in response to such a key having been recognized as a valid key by said means for distinguishing a valid key from an invalid key, and
C) means for causing such an electric power source to be switched on to such a starter branch circuit and such a starter motor to crank such an engine in response to increased lengthwise insertion of such a key into said key-receiving means along such axis at such orientation beyond such initial insertion, provided that said means for distinguishing a valid key from an invalid key has recognized such a key as a valid key, comprising a start switch that is disposed to be physically pushed by such a key upon such increased insertion of such a key into said key-receiving means along such axis at such orientation.

9. An automotive vehicle ignition switch as set forth in claim 8 characterized further in that said key-receiving means comprises detent means defining at least one preferred stable position for lengthwise insertion of such a key into said key-receiving means, said at least one preferred stable position being short of the position where said start switch is physically pushed by such a key upon such increased insertion of such a key into said key-receiving means, and including resilient means for urging such a key back toward said at least one preferred stable position as such a key is pushing said start switch.

10. An automotive vehicle ignition switch as set forth in claim 9 characterized further in that said means for distinguishing a valid key from an invalid key upon initial insertion of such a key lengthwise into said key-receiving means comprises non-contacting key-reading means disposed to read a code on such a key when such a key is in a preferred stable position defined by said detent means.

11. An automotive vehicle ignition switch as set forth in claim 10 characterized further in that said key-reading means comprises a magnetic code reader for reading a magnetically coded key.

12. An automotive vehicle switch as set forth in claim 10 characterized further in that said key-reading means comprises an optical code reader for reading an optically coded key.

13. An automotive vehicle ignition switch for use in selectively connecting an electric power source with plural branch circuits, including a starter branch circuit operatively coupled with a starter motor for cranking an engine of a vehicle, and comprising key-receiving means for receiving an associated key by lengthwise insertion of such a key into said key-receiving means characterized in that said ignition switch comprises:
  A) means for distinguishing a valid key from an invalid key upon initial insertion of such a key lengthwise into said key-receiving means,
  B) means for causing such an electric power source to be switched on to one of such branch circuits other than such a starter branch circuit in response to such a key having been recognized as a valid key by means for distinguishing a valid key from an invalid key, and
  C) means for causing such an electric power source to be switched on to such a starter branch circuit and such a starter motor to crank such an engine in response to increased lengthwise insertion of such a key into said key-receiving means beyond such initial insertion, provided that said means for distinguishing a valid key from an invalid key has recognized such a key as a valid key, comprising a start switch that is disposed to be physically pushed by such a key upon such increased insertion of such a key into said key-receiving means,
  D) said key-receiving means comprises detent means defining at least one preferred stable position for lengthwise insertion of such a key into said key-receiving means, said at least one preferred stable position being short of the position where said start switch is physically pushed by such a key upon such increased insertion of such a key into said key-receiving means, and including resilient means for urging such a key back toward said at least one preferred stable position as such a key is pushing said start switch, and
  E) characterized further in that said detent means defines two such preferred stable positions, namely an Accessory position wherein said ignition switch is effective to switch such an electric power source on to an accessory branch circuit and an On (Ignition) position wherein said ignition switch is effective to switch such an electric power source on to both such an accessory branch circuit and an ignition branch circuit.

14. An automotive vehicle ignition switch for use in selectively connecting an electric power source with plural branch circuits, including a starter branch circuit operatively coupled with a starter motor for cranking an engine of a vehicle, and comprising key-receiving means for receiving an associated key by lengthwise insertion of such a key into said key-receiving means along an imaginary linear axis at one particular circumferential orientation about such axis characterized in that said ignition switch comprises:
  A) means for distinguishing a valid key from an invalid key upon initial insertion of such a key lengthwise into said key-receiving means along such axis at such orientation,
  B) detent means defining at least one preferred stable position for lengthwise insertion of such a key into said key-receiving means along such axis at such orientation,
  C) means for causing such an electric power source to be switched on to one of such branch circuits other than such starter branch circuit in response to such a key having been recognized as a valid key by said means for distinguishing a valid key from an invalid key, and such a key having been inserted to a preferred stable position defined by said detent means, and
  D) means for causing such an electric power source to be switched on to such a starter branch circuit and said starter motor to crank such an engine in response to increased insertion of such a key lengthwise into said key-receiving means along such axis at such orientation beyond said at least one preferred stable position, provided that said means for distinguishing a valid key from an invalid key has recognized such a key as a valid key, comprising a start switch that is disposed to be actuated by such a key upon such increased insertion of such a key into said key-receiving means along such axis at such orientation.

15. An automotive vehicle ignition switch as set forth in claim 14 characterized further in that said start switch is disposed to be physically pushed by such a key upon such increased insertion of such a key into said key-receiving means, and including resilient means for urging such a key back toward said at least one preferred stable position as such a key is pushing said start switch.

16. An automotive vehicle ignition switch as set forth in claim 15 characterized further in that said means for distinguishing a valid key from an invalid key upon initial insertion of such a key lengthwise into said key-receiving means comprises non-contacting key-reading means disposed to read a code on such a key when such a key is in a preferred stable position defined by said detent means.

17. An automobile vehicle ignition switch as set forth in claim 16 characterized further in that said key-reading means comprises a magnetic code reader for reading a magnetically coded key.

18. An automotive vehicle ignition switch as set forth in claim 16 characterized further in that said key-reading means comprises an optical code reader for reading an optically coded key.

19. An automobile vehicle ignition switch for use in selectively connecting an electric power source with plural branch circuits, including a starter branch circuit operatively coupled with a starter motor for cranking an engine of a vehicle, and comprising key-receiving means for receiving an associated key by lengthwise insertion of such a key into said key-receiving means characterized in that said ignition switch comprises:
  A) means for distinguishing a valid key from an invalid key upon initial insertion of such a key lengthwise into said key-receiving means,
  B) detent means defining at least one preferred stable position for lengthwise insertion of such a key into said key-receiving means,
  C) means for causing such an electric power source to be switched on to one of such branch circuits other than such starter branch circuit in response to such a key having been recognized as a valid key by said means for distinguishing a valid key from an invalid key, and such a key having been inserted to a preferred stable position defined by said detent means, D) means for causing such an electric power source to be switched on to such a starter branch circuit and said starter motor to crank such an engine in response to increased insertion of such a key lengthwise into said key-receiving means beyond said at least one preferred stable position, provided that said means for distinguishing a valid key from an invalid key has recognized such a key as a valid key, comprising a start switch that is disposed to be actuated by such a key upon such increased insertion of such a key into said key-receiving means, E) said start switch is disposed to be physically pushed by such a key upon such increased insertion of such a key into said key-receiving means, and including resilient means for urging such a key back toward said at least one preferred stable position as such a key is pushing said start switch, and F) characterized further in that said detent means defines two such preferred stable positions, namely an Accessory position wherein said ignition switch is effective to switch such an electric power source on to an accessory branch circuit and an On (Ignition) position wherein said ignition switch is effective to switch such an electric power source on to both such an accessory branch circuit and an ignition branch circuit.

* * * * *